United States Patent
Simon (10) Patent No.: US 6,367,759 B1
(45) Date of Patent: Apr. 9, 2002

(54) GRIPPING MEANS AND APPARATUS FOR ATTACHING TO ROTATIONAL AN CAKE DECORATING APPARATUS

(75) Inventor: Bruce R. Simon, Baltimore, MD (US)

(73) Assignee: NHS Enterprises, Inc., Baltimore, MD (US)

( * ) Notice: Subject to any disclaimer, the term of this patent is extended or adjusted under 35 U.S.C. 154(b) by 0 days.

(21) Appl. No.: 09/293,809

(22) Filed: Apr. 19, 1999

(51) Int. Cl.[7] ............................................. F16M 13/00
(52) U.S. Cl. ...................... 248/425; 108/139; 108/141; 108/142; 248/415; 248/522
(58) Field of Search ............................ 248/159, 176.1, 248/346.11, 349.1, 687, 415, 418, 419, 420–425, 429, 519, 521–523; 108/90, 101, 139, 141; 211/133.1, 85.4

(56) References Cited

U.S. PATENT DOCUMENTS

| | | | |
|---|---|---|---|
| 1,401,057 A | * 12/1921 | Elliott | 108/101 |
| 2,347,041 A | * 4/1944 | Filsinger | 222/534 |
| 3,690,610 A | * 9/1972 | Peirce | 248/19 |
| 3,724,798 A | * 4/1973 | Lucasey | 248/418 |
| 3,814,032 A | * 6/1974 | McMains | 108/101 |
| 4,334,482 A | * 6/1982 | Bolduc | 108/95 |
| 4,572,595 A | 2/1986 | Chapman | |
| 4,793,266 A | 12/1988 | Napolitano et al. | |
| 4,934,423 A | 6/1990 | Withrow | |
| 5,018,695 A | * 5/1991 | Bishop | 248/346.1 |
| 5,209,013 A | * 5/1993 | Sellers | 248/346.1 |
| 5,535,684 A | * 7/1996 | John | 248/425 X |
| 5,692,581 A | * 12/1997 | Nelson et al. | 182/129 |
| 5,720,524 A | * 2/1998 | Hall | 248/415 X |

* cited by examiner

Primary Examiner—Ramon O Ramirez
Assistant Examiner—Tan Le
(74) Attorney, Agent, or Firm—Cantor Colburn, LLP (57) ABSTRACT

An improved rotational cake decorating apparatus, commonly known as a Lazy Susan, used in the decoration, display and service of cakes. Said improved rotational cake decorating apparatus has a novel gripping means disposed thereon for improved rotational control.

A donut shaped apparatus with a novel gripping means disposed thereon to be fixably attached to an existing rotational cake decorating apparatus. Said donut shaped apparatus with said novel gripping means provides for improved rotational control of said existing rotational cake decorating apparatus.

A radial extension apparatus with a novel gripping means disposed thereon that can be removably attached to an existing rotational cake decorating apparatus. The radial extension apparatus provides a larger surface for supporting a work product such as a cake whereby the surface for supporting a cake on the existing rotational cake decorating apparatus is increased allowing for the decoration of larger cakes. The novel gripping means provides for improved rotational control of said existing rotational cake decorating apparatus with said radial extension apparatus attached thereto.

These apparatuses allow the decorator or server of the cake to remain stationary yet still have access to the entire cake surface.

18 Claims, 12 Drawing Sheets

FIG. 1

PRIOR ART

GRIPPING MEANS AND APPARATUS FOR ATTACHING TO ROTATIONAL AN CAKE DECORATING APPARATUS

BACKGROUND OF THE INVENTION

1. Field of the Invention

The present invention relates generally to a novel gripping means which when disposed on a rotational cake decorating apparatus, commonly known as a Lazy Susan, allows the decorator or server of the cake to remain stationary yet still have access to the entire cake surface. The novel gripping means disposed on said rotational cake decorating apparatus is a plurality of gripping means for increasing the operators' ability to rotate said rotational positioning apparatus.

More particularly, the present invention relates to an improved rotational cake decorating apparatus. Said rotational cake decorating apparatus has been improved by disposing said novel gripping means thereon for improved rotational control. The present invention further relates to a donut shaped apparatus with said novel gripping means disposed thereon that can be fixably attached to said existing rotational cake decorating apparatus. The present invention further relates to a radial extension apparatus with said novel gripping means disposed thereon that can be removably attached to said existing rotational cake decorating apparatus.

2. Description of the Prior Art

Rotational positioning apparatuses, commonly known as Lazy Susans, are well known and have been modified and patented for many different uses. One such patented use for a rotational positioning apparatus is disclosed in U.S. Pat. No. D260,343 for a rotatable food service assembly. Another such patented use for a rotational positioning apparatus is disclosed in U.S. Pat. No. 4,775,055 for a spice container rack. Another such patented use for a rotational positioning apparatus is disclosed in U.S. Pat. No. 5,653,443 for a rotatable cribbage board.

One such modification to the existing rotational positioning apparatus has been made for use in the decoration, display and service of cakes. Products that provide a means for rotationally positioning cakes during decoration, display and service are well known. These cake-supporting apparatus allow the decorator or server of the cake to remain stationary yet still have access to the entire cake surface by rotating the support surface supporting the cake. Generally, the rotationally adjustable cake-supporting surface is designed to help decorate cakes by allowing the decorator to use one hand to rotate the cake-supporting surface while using the other hand to decorate the cake with icing and the like. When icing a cake, the decorator often times needs to "rock" or rotate the cake back and forth to smooth out the icing. If the decorator's hand is slick with icing or other baking debris and the bottom surface of the cake support surface is smooth, then the rocking of the cake can be very difficult.

A specific modification of the apparatus for rotationally positioning a cake is disclosed in U.S. Pat. No. 4,793,266. The apparatus disclosed is a cake support stand wherein the surface used to support the cake for decorating is adjustable both radially and vertically. The position of the cake support surface can be adjusted both as to elevation and the angular orientation relative to the location of the cake-decorator in order to facilitate the activity of the decorating the cake. The bottom of the cake support surface includes finger-tabs to facilitate selective rotation of the cake support platform. This patent discloses a cake-decorating stand that is mounted on a dolly equipped with wheels so that the decorator can move the cake mounted on this device to the best position horizontally for decorating. This patent is distinct from the present invention as the present invention discloses novel gripping means disposed on an existing rotational cake decorating apparatus, discloses a donut shaped apparatus to be affixably attached to said existing rotational cake decorating apparatus and discloses an apparatus with said novel gripping means that extends the diameter of an existing rotational cake decorating apparatus Most commercially available cake decoration and display stands are provided with a cake support surface with a set diameter. The set diameter is customarily limited to twelve inches, yet the diameter of many cakes, such as wedding cakes, can be eighteen inches or more. If the diameter of the cake to be decorated is a larger than the diameter of the existing rotatable cake-decorating stand, the decorator will oftentimes place the cake on a cake-board that has a diameter larger than the cake to be decorated. The cake-board will then be placed onto the rotatable cake support surface. In order to rotate the cake for decoration, the decorator needs to reach under the cake-board to turn the cake support surface. This means that one hand is working several inches back from the other hand. This is a very awkward position in which to work and makes the smooth rotation of the cake support surface very difficult. Furthermore, when using this technique the friction between the rotatable cake support surface and the cake-board holding the cake will not be sufficient such that when the cake support surface is rotated, the cake-board will shift and become un-centered or off balanced from the cake support surface. The un-centered or off balanced cake-board does not allow for even cake decoration. Alternately, the distance between the cake-board and the cake support surface is too large such that the decorator is unable to reach under the cake-board to turn the cake support surface and instead will use the cake board itself as the means to rotate the cake. Again, this method causes the cake-board to shift and become un-centered or off balanced from the cake support surface. The un-centered or off balanced cake-board does not allow for even cake decoration.

The manufacturing of larger diameter rotatable cake support surfaces which have a novel gripping means disposed thereon is possible. But, cake decorating professionals have been purchasing and using cake decorating stands with the standard twelve inch diameter and the smooth bottom limitations for many years. Therefore, most bakeries have at least one or more cake decoration and display stands that are limited to twelve inches and provide a smooth surface on the bottom of the cake support surface. Replacing or supplementing this inventory of cake decorating stands with new, larger stands or with stands that have a gripping means is not economically feasible and would require large amounts of storage space. The radial extension apparatus and donut shaped apparatus of the present invention allows these bakeries to maximize the range of cake diameters their cake decorating equipment will support while minimizing the cost and storage space needed to hold said equipment.

Additionally, products providing means for extending a support surface are well known. One method of providing for the extension of a support surface is disclosed in U.S. Pat. No.4,934,423. This patent is for a permanently attached extension table with a support frame to attach to commercially available tables by means of a "U" channel member. This patent discloses an extension to a rectangular worktable with two parallel guide rails fixed to the support frame. Although the extension surface is horizontally slidable on the guide rails, it is not rotatable nor is it used in the food preparation and service industry. This patent distinct from the present invention as the present invention discloses a circular table attachment, which is removably attached to a standard circular cake support platform and which is rotatable.

Accordingly, a continuing need exists for an improved rotational cake decorating apparatus, a donut shaped apparatus and a radial extension apparatus with novel gripping means disposed thereon.

SUMMARY OF THE INVENTION

It is an object of the present invention to provide an improved rotational cake decorating apparatus used in the decoration, display and service of cakes with a novel gripping means disposed thereon. The novel gripping means provides improved rotational control of said rotational cake decorating apparatus under normal working conditions, such as slippery hands.

It is a further object of the present invention to provide a donut shaped apparatus with a novel gripping means disposed thereon. Said donut shaped apparatus is to be fixably attached to an existing rotational cake decorating apparatus. Said donut shaped apparatus with said novel gripping means provides for improved rotational control of said existing rotational cake decorating apparatus.

It is a further object of the present invention to provide a radial extension apparatus that can be removably attached to an existing rotational cake decorating apparatus used in the decoration, display and service of cakes. The radial extension apparatus provides a larger surface for supporting a work product, such as a cake, whereby the surface for supporting a cake of the existing rotational cake decorating apparatus is increased allowing for the decoration of larger cakes. It is a further object of the present invention to provide said radial extension apparatus with a novel gripping means disposed thereon. The novel gripping means provides for improved rotational control of said radial extension apparatus. This cake-supporting apparatus allows the decorator or server of the cake to remain stationary yet still have access to the entire cake surface of cakes with diameters larger than twelve inches.

It is a further object of the present invention to provide a method for using said novel gripping means disposed on said rotational cake decorating apparatus. Further objects of the present invention will be made apparent in the following detailed description of the preferred embodiments and the appended claims.

DETAILED DESCRIPTION OF THE PREFERRED EMBODIMENTS

Figure 1:
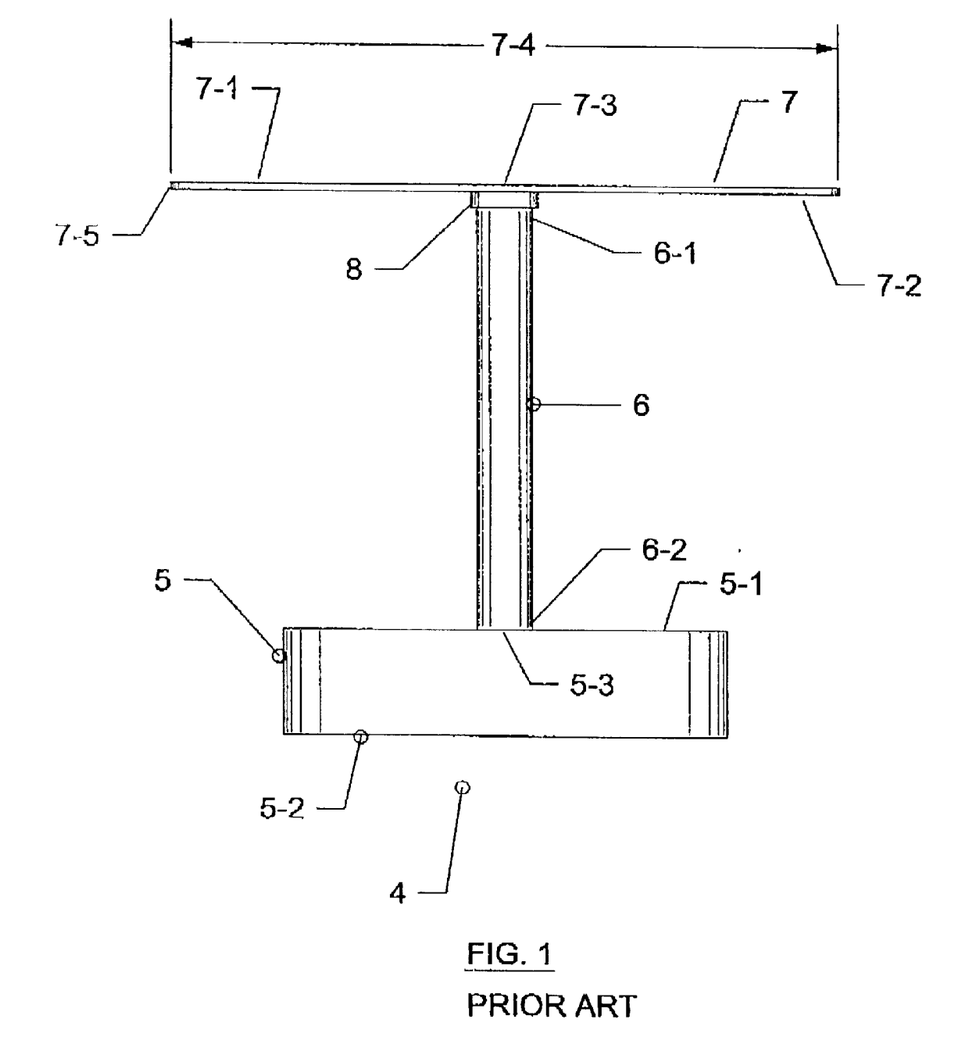
FIG. 1 is a side view of an existing rotational cake decorating apparatus used to support cakes during decoration, display and service.

An example of an existing rotational cake decorating apparatus 4 used in the decoration, display and service of cakes is shown in FIG. 1. Said existing rotational cake decorating apparatus 4 comprises a base 5 with a top 5-1, a bottom 5-2 and a center 5-3, a shaft 6 with a top end 6-1 and a bottom end 6-2, and a cake-support-surface 7 with a top 7-1, a bottom 7-2, a center 7-3 and a diameter 7-4 defining an edge 7-5. The bottom 5-2 of said base 5 is placed on a work surface. The bottom end 6-2 of said shaft 6 is fixably attached to the center 5-3 of the top 5-1 of said base 5. The top end 6-1 of said shaft 6 is rotatably attached to the center 7-3 of the bottom 7-2 of said cake-support-surface 7. During the normal use of decorating, displaying and serving a cake, the cake is placed on the top 7-1 of said cake-support-surface.

Figure 2:
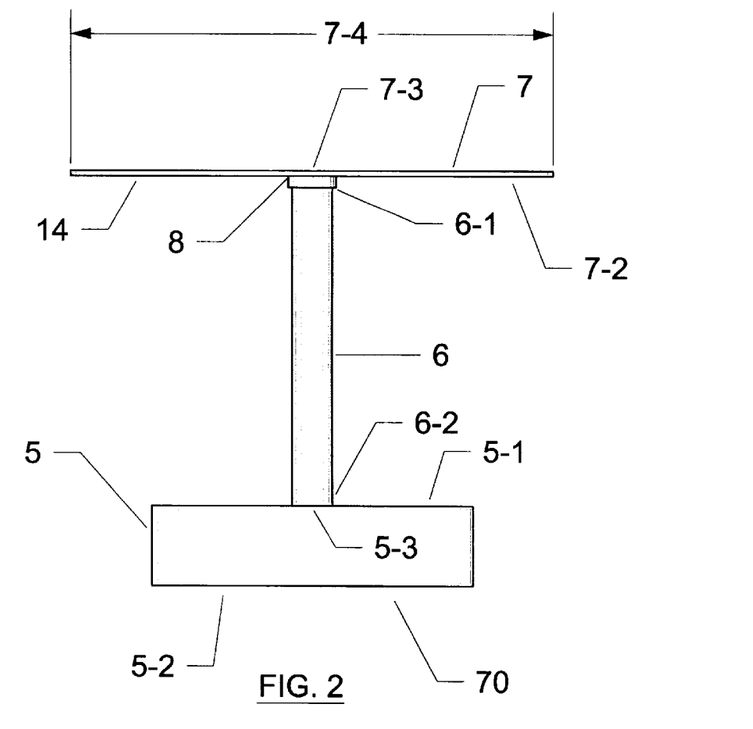
FIG. 2 is a side view of an improved rotational cake decorating apparatus used to support cakes during decoration, display and service.

An improved rotational cake decorating apparatus 70 wherein said existing rotational cake decorating apparatus 4 further includes a plurality of gripping means 14 disposed on the bottom 7-2 of said cake-support surface 7.

Said plurality of novel gripping means 14 are shown in FIG. 2, FIG. 3, FIG. 4, and FIG. 5. Said plurality of gripping means 14 are disposed on a portion 21 of the bottom 7-2 of said cake-support surface 7. Said portion 21 is defined on the bottom 7-2 of said cake-support surface 7, extending from the edge 7-5 of said cake-support surface 7 radially inward approximately two inches.

Figure 3:
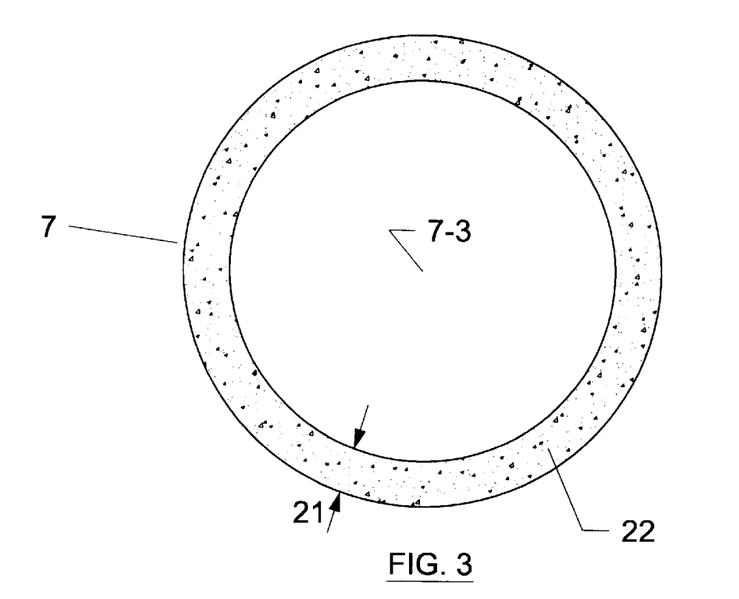
FIG. 3 is a bottom view of the cake support surface of the improved rotational cake decorating apparatus detailing the gripping texture embodiment of the plurality of gripping means.

In one embodiment contemplated by the inventor, shown in FIG. 3, said plurality of gripping means 14 is a gripping texture 22 radially disposed within said portion 21 on said bottom 7-2 of said cake-support surface 7. In one alternative of this embodiment, said gripping texture 22 is provided by knurling and the like within said portion 21 on said bottom 7-2 of said cake-support surface 7. Using this embodiment, the adjustment of the radial position of said cake-support surface 7 is achieved when the decorator "walks" their fingers from said gripping texture 22 near the edge 7-5 of said cake-support surface 7 to said gripping texture 22 near the center 7-3 of cake-support surface 7.

Figure 4:
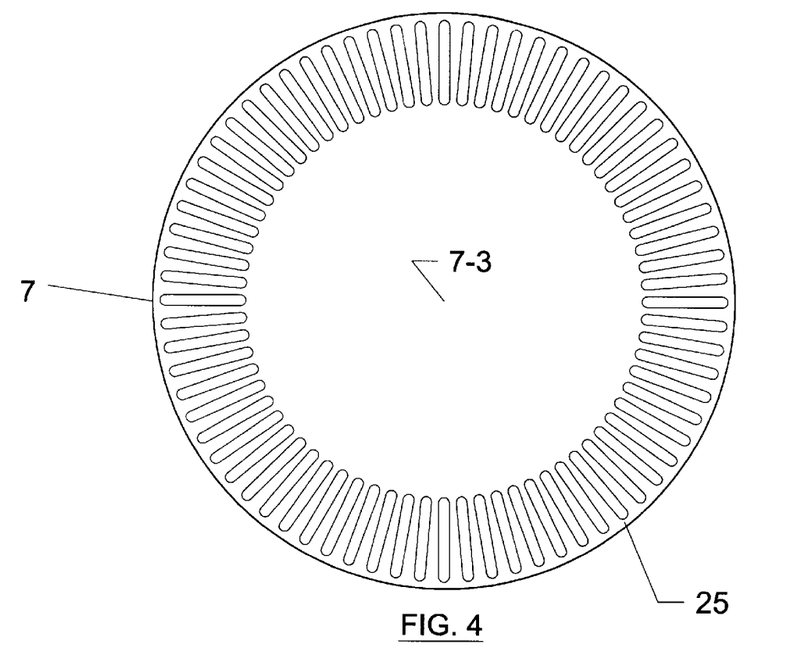
FIG. 4 is a bottom view of the cake support surface of the improved rotational cake decorating apparatus detailing the linear indentation embodiment of the plurality of gripping means.
Figure 5:
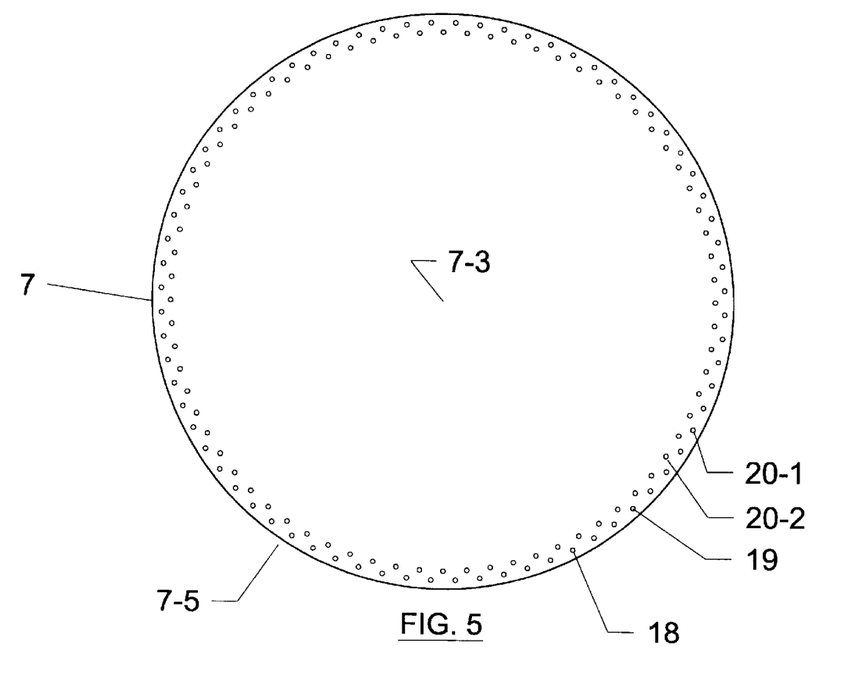
FIG. 5 is a bottom view of the cake support surface of the improved rotational cake decorating apparatus detailing the divot hole embodiment of the plurality of gripping means.

In another embodiment contemplated by the inventor, said plurality of gripping means 14 is a plurality of indentations radially disposed in one or more rows within said portion 21 on said bottom 7-2 of cake-support surface 7. In one alternative of this embodiment as shown in FIG. 4, said indentations are linear indentations 25 provided in one row. In a second alternative of this embodiment as shown in FIG. 5, said indentations are circular divot holes 18 provided in two rows. This configuration is the preferred embodiment and is described in detail below. Using these embodiments, the adjustment of the radial position of said cake-support surface 7 is achieved when the decorator "walks" their fingers from one of said plurality of indentations near the edge 7-5 of said cake-support surface 7 to another of said plurality of indentations near the center 7-3 of said cake-support surface 7.

In the preferred embodiment, said plurality of gripping means 14 are circular divot holes 18 approximately 0.08 inches deep and approximately 0.5 inches in diameter. Said divot holes have a center 19. Said divot holes 18 are provided in two rows 20-1 and 20-2 around the circumference of said cake-support surface 7. The first row 20-1 of divot holes 18 is closest to the edge 7-5 of said cake-support surface 7. The second row 20-2 of divot holes 18 is farthest from the edge 7-5 of said cake-support surface 7.

The centers 19 of said divot holes 18 in said first row 20-1 are approximately 0.5 inches from the edge 7-5 of said cake-support surface 7. The centers 19 of said divot holes 18 in said first row 20-1 are approximately 0.75 inches apart from one another. There are a total of seventy-two divot holes 18 in said first row 20-1. The approximately 0.5 inches between the edge 7-5 of said cake-support surface 7 and the centers 19 of said divot holes 18 in said first row 20-1 is provided so that said improved rotational cake decorating apparatus 70 is adapted to further receive a radial extension apparatus 10 as described in detail below.

The centers 19 of said divot holes 18 in said second row 20-2 are approximately 1.125 inches from the edge 7-5 of said cake-support surface 7. The centers 19 of said divot holes 18 in said second row 20-2 are approximately 0.6875 inches apart from one another. There are a total of seventy-two divot holes 18 in said second row 20-2. The centers 19 of said divot holes 18 in said second row 20-2 are offset to either side of the centers 19 of said divot holes 18 in said first row 20-1.

Using said divot holes 18 in the configuration described above allows the user to rotate the radial position of said cake-support surface 7 by "walking" their fingers from one divot hole 18 in the first row 20-1 to another divot hole 18 in the second row 20-2. The divot holes 18 provide a means for gripping even with slippery fingertips that can easily be cleaned by providing large rounded corners.

Figure 6:
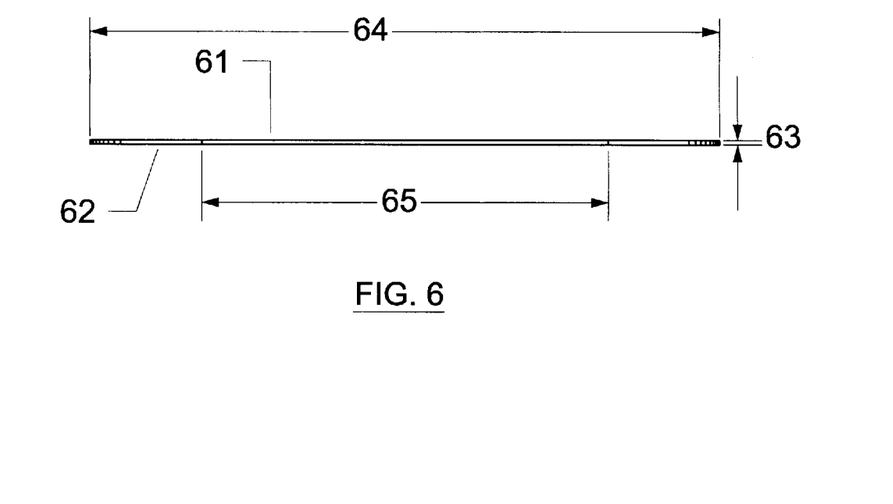
FIG. 6 is a side view of the donut shaped apparatus to be affixably attached to an existing rotational cake decorating apparatus.
Figure 7:
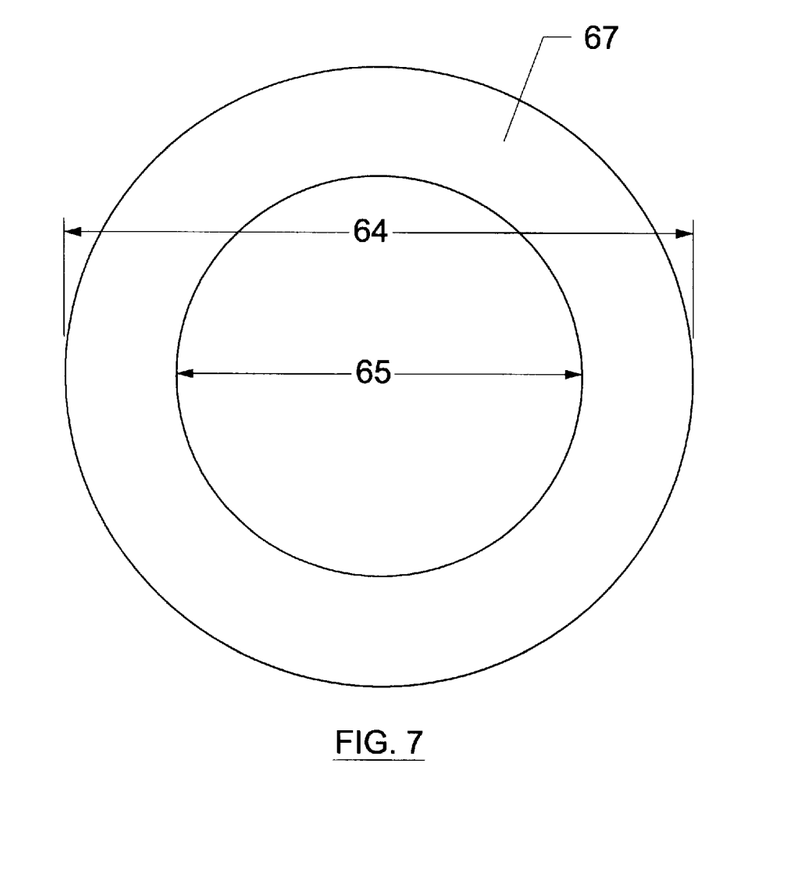
FIG. 7 is a top view of the donut shaped apparatus to be affixably attached to an existing rotational cake decorating apparatus detailing the means for affixably attaching said donut shaped apparatus to an existing rotational cake decorating apparatus.
Figure 8:
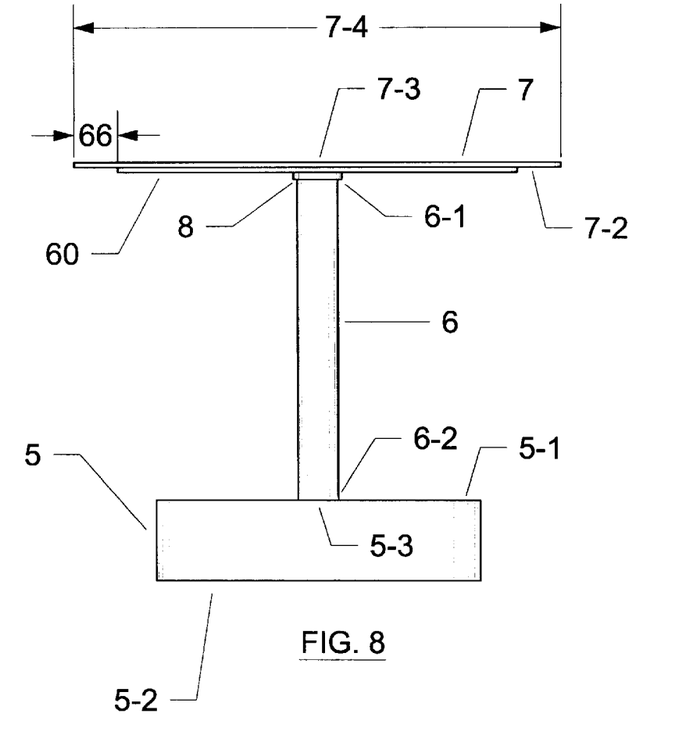
FIG. 8 is a side view of the donut shaped apparatus as affixably attached to an existing rotational cake decorating apparatus.

A second apparatus contemplated by the inventor is a donut shaped apparatus 60 with a novel gripping means 14 disposed thereon is shown in FIG. 6, FIG. 7 and FIG. 8. Said donut shaped apparatus 60 can be affixably attached to the bottom 7-2 of said cake-support surface 7 of said existing rotational cake decorating apparatus 4.

As shown in FIG. 6, said donut shaped apparatus 60, has a thickness 63, a circular bottom surface 62, and a flat circular top surface 61 for being affixably attached to the bottom 7-2 of said cake-support surface 7 of said existing rotational cake decorating apparatus 4. Said donut shaped apparatus 60 has a thickness 63 of about one eighth of an inch. Said donut shaped apparatus 60 has an outer diameter 64 that is approximately one half of an inch less than the diameter 7-4 of said cake support surface 7 and an inner diameter 65 that is approximately two inches less than said outer diameter 64. In one alternative of the preferred embodiment shown, the diameter 7-4 of said cake support surface 7 is approximately twelve inches, resulting in said donut shaped apparatus 60 with an outer diameter 64 of approximately eleven and one half inches and an inner diameter 65 of approximately nine and one half inches. In alternative embodiments, said donut shaped apparatus 60 is provided to fit on the various diameters 7-4 of the cake-support surfaces 7 that are commercially available. This includes cake-support surfaces 7 with diameters 7-4 approximately equal to fourteen inches, sixteen inches and eighteen inches.

The donut shaped apparatus 60 can be made from any food grade safe material including aluminum, plastic, rubber, stainless steel and any combination thereof. In one alternative of the preferred embodiment shown, said donut shaped apparatus 60 is made of plastic minimize the cost and weight. In a second alternative of the preferred embodiment, said donut shaped apparatus 60 is made of rubber. A means for affixably attaching 67 said donut shaped apparatus 60 to the bottom 7-2 of said cake-support-surface 7 is provided and shown in FIG. 7. The means for affixably attaching 67 said donut shaped apparatus 60 to the bottom 7-2 of said cake-support-surface 7 contemplated by the inventor includes glue, adhesives and the like applied to the entire top surface 61 of said donut shaped apparatus 60.

FIG. 8 shows said donut shaped apparatus 60 as attached to said cake-support surface 7. Said donut shaped apparatus 60 is affixed to the bottom 7-2 of said cake-support surface 7 such that the outer diameter 64 of said donut shaped apparatus 60 is approximately one half of an inch from the edge 7-5 of said cake-support surface 7 defining a space 66 there between. The space 66 is provided so that said cake-support surface 7 with said donut shaped apparatus 60 affixed thereon is adapted to further received a radial extension apparatus 10 which is described in detail below.

A plurality of novel gripping means 14 are disposed on the bottom surface 62 of said donut shaped apparatus 60 and are shown in FIG. 9, FIG. 10, FIG. 11, FIG. 12 and FIG. 13.

Figure 9:
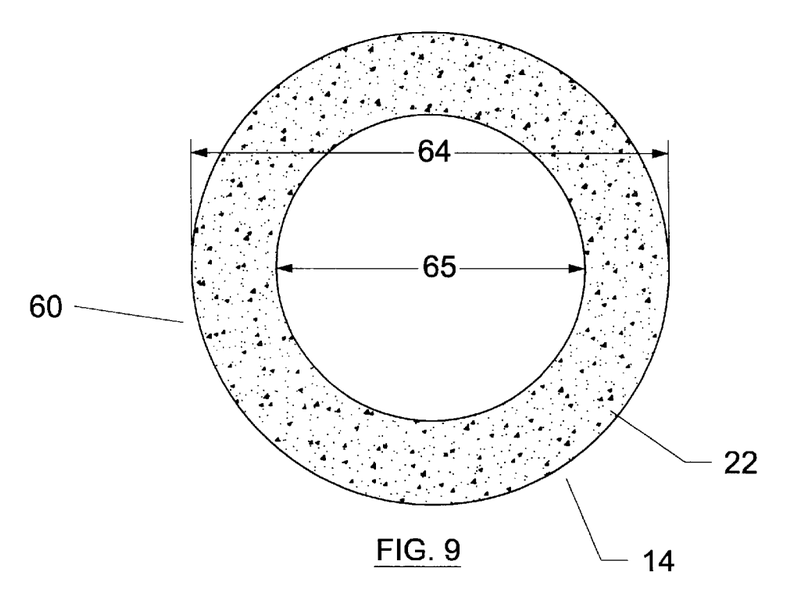
FIG. 9 is a bottom view of the donut shaped apparatus detailing the gripping texture embodiment of the plurality of gripping means.

In one embodiment contemplated by the inventor shown in FIG. 9, said plurality of gripping means 14 is a gripping texture 22 disposed on said bottom surface 62 of said donut shaped apparatus 60. In one alternative of this embodiment, said gripping texture 22 is provided by knurling and the like. Using this embodiment, the adjustment of the radial position of said donut shaped apparatus 60 while affixed to an existing rotational cake decorating apparatus 4 is achieved when the decorator "walks" their fingers from said gripping texture 22 near the outer diameter 64 of said donut shaped apparatus 60 to said gripping texture 22 near the inner diameter 65 of said donut shaped apparatus 60.

Figure 10:
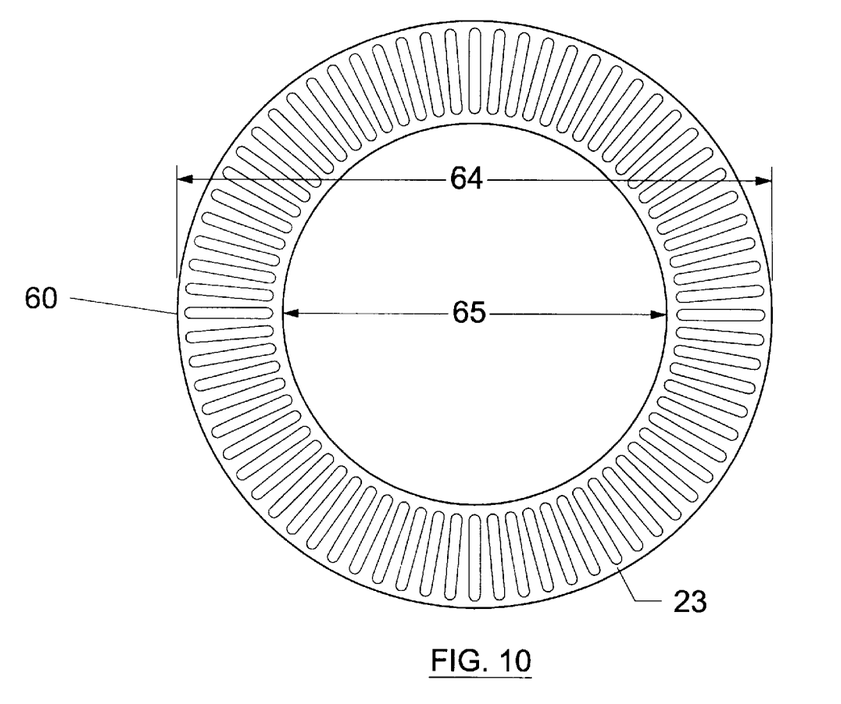
FIG. 10 is a bottom view of the donut shaped apparatus detailing the linear protrusion embodiment of the plurality of gripping means.
Figure 11:
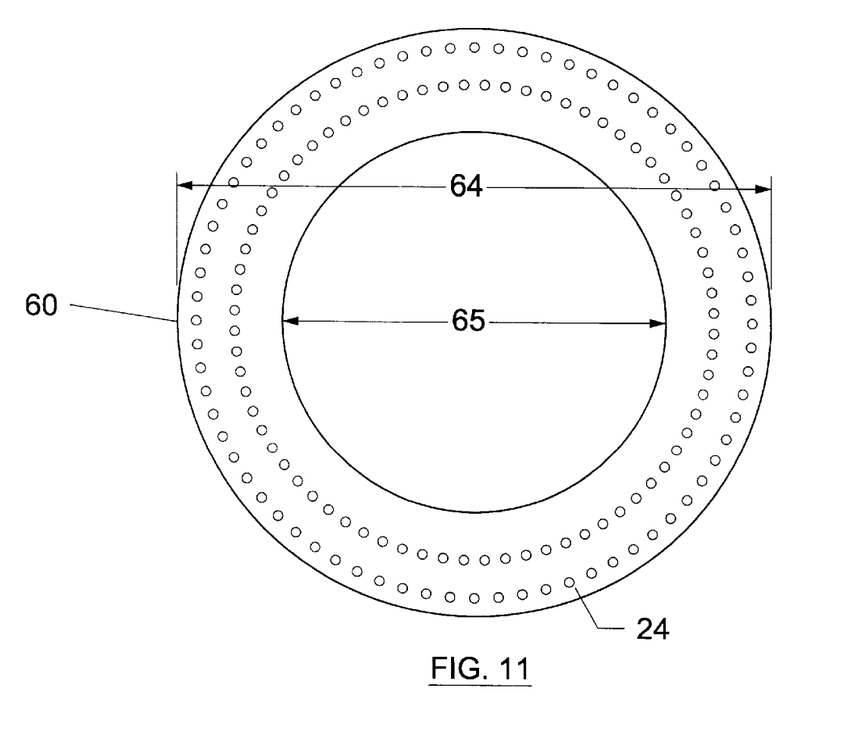
FIG. 11 is a bottom view of the donut shaped apparatus detailing the circular protrusion embodiment of the plurality of gripping means.

In another embodiment contemplated by the inventor, said plurality of gripping means 14 is a plurality of protrusions radially disposed in one or more rows on said bottom surface 62 of said donut shaped apparatus 60. In one alternative of this embodiment as shown in FIG. 10, said protrusions are linear protrusions 23 provided in one row. In a second alternative of this embodiment as shown in FIG. 11, said protrusions are circular protrusions 24 provided in two rows. Using these embodiments, the adjustment of the radial position of said donut shaped apparatus 60 while affixed to an existing rotational cake decorating apparatus 4 is achieved when the decorator "walks" their fingers from one of said plurality of protrusions near the outer diameter 64 of said donut shaped apparatus 60 to another of said plurality of protrusions near the inner diameter 65 of said donut shaped apparatus 60.

Figure 12:
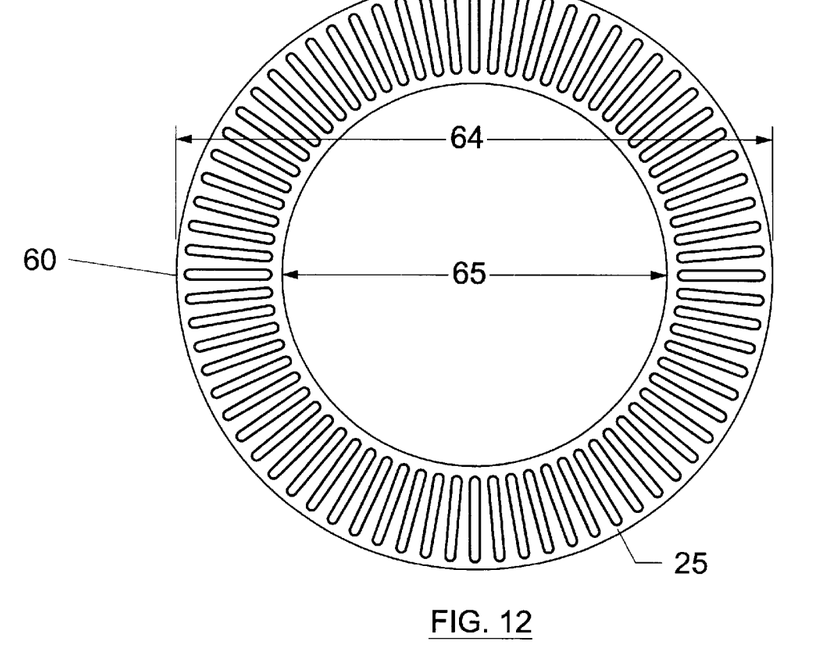
FIG. 12 is a bottom view of the donut shaped apparatus detailing the linear indentation embodiment of the plurality of gripping means.
Figure 13:
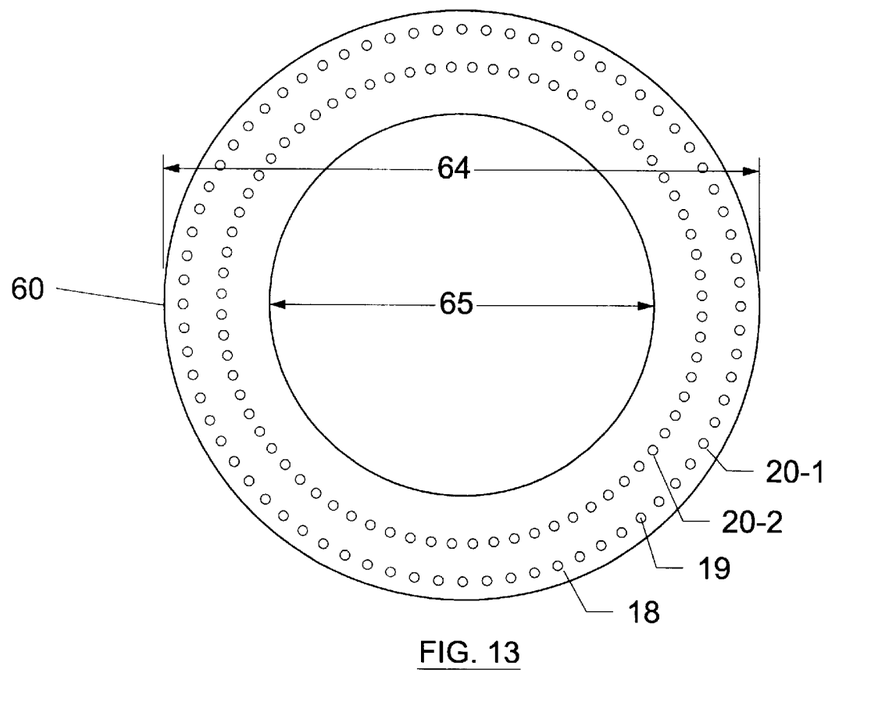
FIG. 13 is a bottom view of the donut shaped apparatus detailing the divot hole embodiment of the plurality of gripping means.

In another embodiment contemplated by the inventor, said plurality of gripping means 14 is a plurality of indentations radially disposed in one or more rows on said bottom surface 62 of said donut shaped apparatus 60. In one alternative of this embodiment as shown in FIG. 12, said indentations are linear indentations 25 provided in one row. In a second alternative of this embodiment as shown in FIG. 13, said indentations are circular divot holes 18 provided in two rows. This configuration is the preferred embodiment and is described in detail below. Using these embodiments, the adjustment of the radial position of said donut shaped apparatus 60 affixed to an existing rotational cake decorating apparatus 4 is achieved when the decorator "walks" their fingers from one of said plurality of indentations near the outer diameter 64 of said donut shaped apparatus 60 to another of said plurality of indentations near the inner diameter 65 of said donut shaped apparatus 60.

In the preferred embodiment, said plurality of gripping means 14 are circular divot holes 18 approximately 0.08 inches deep and approximately 0.5 inches in diameter. Said divot holes have a center 19. Said divot holes 18 are provided in two rows 20-1 and 20-2 around the circumference of said donut shaped apparatus 60. The first row 20-1 of divot holes 18 is closest to the edge 63 of said donut shaped apparatus 60. The second row 20-2 of divot holes 18 is farthest from the edge 63 of donut shaped apparatus 60.

The centers 19 of said divot holes 18 in said first row 20-1 are approximately 0.5 inches from the edge 63 of said donut shaped apparatus 60. The centers 19 of said divot holes 18 in said first row 20-1 are approximately 0.75 inches apart from one another. There are a total of seventy-two divot holes 18 in said first row 20-1.

The centers 19 of said divot holes 18 in said second row 20-2 are approximately 1.125 inches from the edge 63 of said donut shaped apparatus 60. The centers 19 of said divot holes 18 in said second row 20-2 are approximately 0.6875 inches apart from one another. There are a total of seventy-two divot holes 18 in said second row 20-2. The centers 19 of said divot holes 18 in said second row 20-2 are offset to either side of the centers 19 of said divot holes 18 in said first row 20- 1.

Using said divot holes 18 in the configuration described above allows the user to rotate the radial position of said donut shaped apparatus 60 affixed to an existing rotational cake decorating apparatus 4 by "walking" their fingers from one divot hole 18 in the first row 20-1 to another divot hole 18 in the second row 20-2. The divot holes 18 provide a means for gripping that can easily be cleaned by providing large rounded corners.

A third apparatus contemplated by the inventor is a radial extension apparatus 10 with novel gripping means 14 disposed thereon. Said radial extension apparatus 10 can be removably attached to said cake-support surface 7 of said existing rotational cake decorating apparatus 4.

Figure 14:
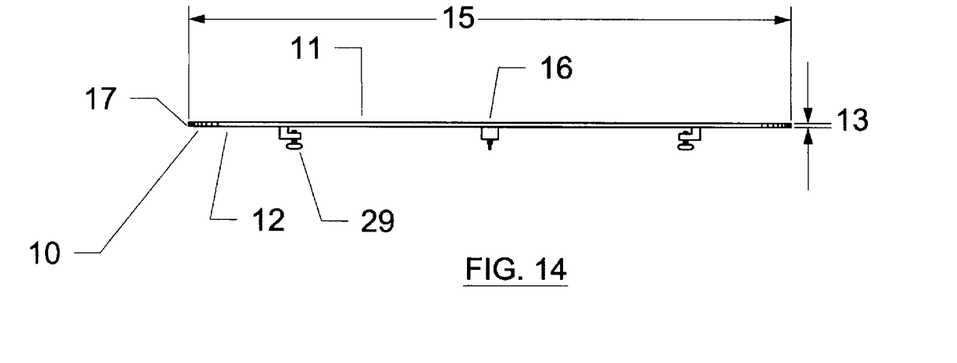
FIG. 14 is a side view of the radial extension apparatus to be removably attached to an existing rotational cake decorating apparatus.
Figure 15:
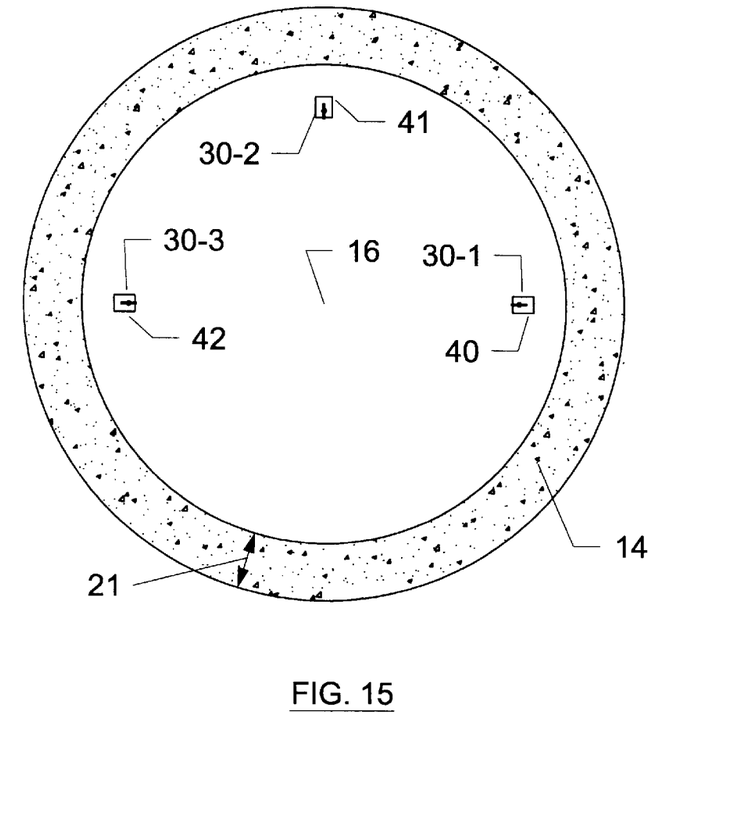
FIG. 15 is a bottom view of the radial extension apparatus detailing the clamps used for removably attaching said radial extension apparatus to said existing rotational cake decorating apparatus.

A radial extension apparatus 10 with a flat circular top surface 11 for supporting a work product such as a cake, a circular bottom surface 12 and a thickness 13 defining an edge 17 is shown in FIG. 14 and FIG. 15. Said radial extension apparatus 10 has a center 16, a circumference and a diameter 15 that is larger than the diameter of the existing rotational cake decorating apparatus. In the preferred embodiment shown, the diameter 15 is approximately eighteen inches and the thickness 13 is approximately 0.125 inches.

The radial extension apparatus 10 can be made from any food grade safe material including aluminum, plastic, stainless steel and any combination thereof. In the preferred embodiment shown, the radial extension apparatus 10 is made of anodized aluminum to standardize to the baking industry standards for equipment.

Figure 16:
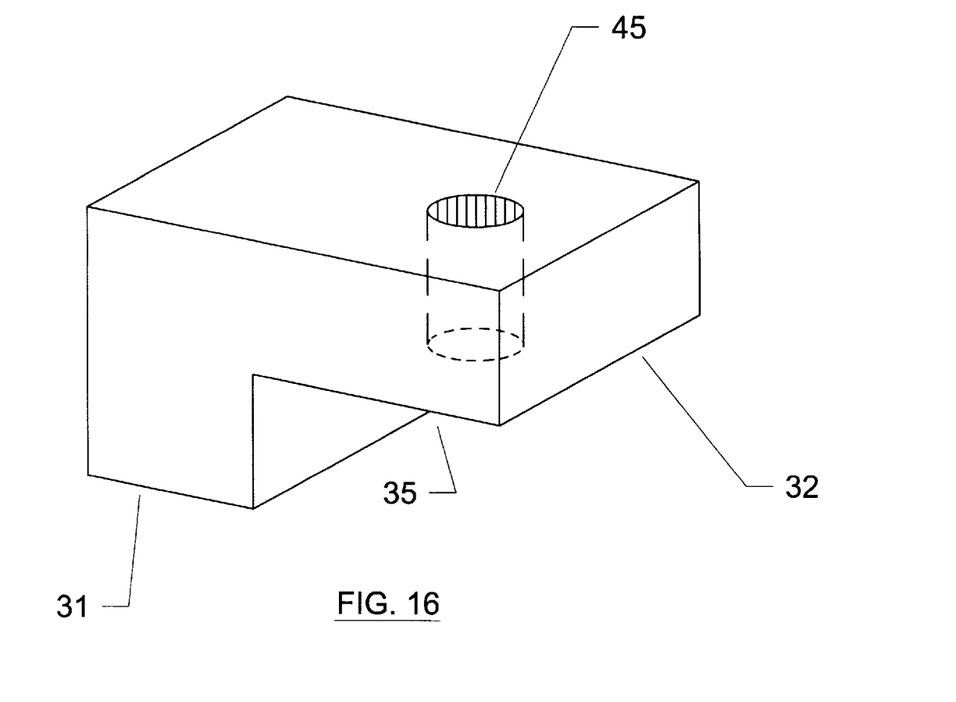
FIG. 16 is a perspective view of the clamps used for removably attaching said radial extension apparatus to said existing rotational cake decorating apparatus.

A means for removably attaching 29 said radial extension apparatus 10 to an existing rotational cake decorating apparatus 4 are disposed on the bottom surface 12 of said radial extension apparatus 10. In the preferred embodiment, the means for removably attaching 29 said radial extension apparatus 10 to said cake-support-surface 7 of said existing rotational cake decorating apparatus 4 are three clamps 30. As shown in FIG. 16, each of said clamps 30 has a first end 31 and a second end 32 and is formed into the shape of an L. The first of the ends 31 of each of said clamps 30 and is welded or fixably attached to the bottom 12 of said radial extension apparatus 10 to form a recess 35 defined between the bottom 12 of said radial extension apparatus 10 and each of said clamps 30. Said recess 35 for accepting the cake-support-surface 7 of said existing rotational cake decorating apparatus 4. In the preferred embodiment, said recess 35 is approximately ³⁄₁₆ of an inch in height and ⅜ of an inch wide by ⅜ of an inch long and each of said clamps 30 are made of aluminum.

Figure 17:
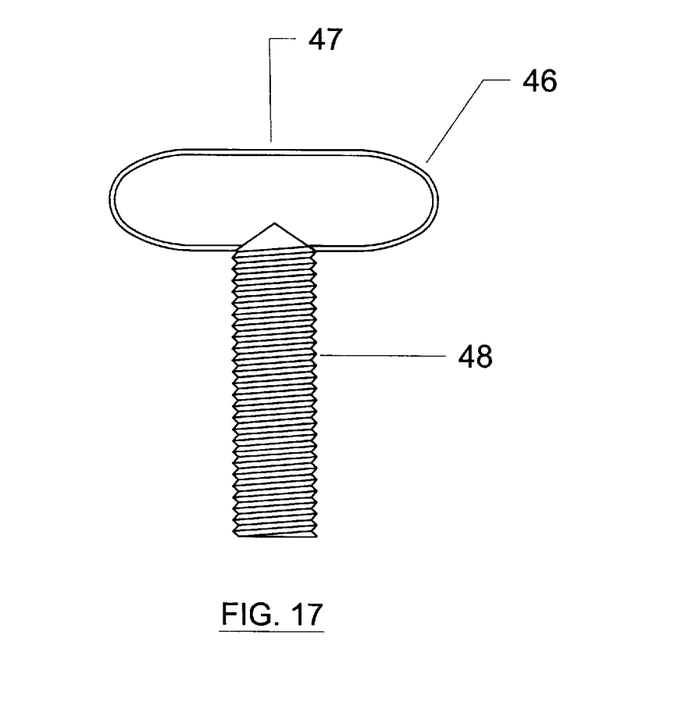
FIG. 17 is a side view of the thumb screw used for removably attaching said radial extension apparatus to an existing rotational cake decorating apparatus.

Each of said clamps 30 have a threaded-bolt-hole 45 defined therein. As shown in FIG. 17, a thumbscrew 46 with a head 47 and a threaded-shaft 48 is threadably attached through said threaded-bolt-hole 45 of each of said clamps 30. Said threaded-bolt-hole 45 is positioned on each of said clamps 30 such that when said thumb-screw 46 is threadably attached to each of said clamps 30, said threaded-shaft 48 protrudes through said threaded-bolt-hole 45 defined within each of said clamps 30 into said recess 35 defined between the bottom 12 of said radial extension apparatus 10 and each of said clamps 30.

As shown in FIG. 14 and FIG. 15, each of said clamps 30 is welded or fixably attached to the bottom 12 of said radial extension apparatus 10 approximately six inches from the center 16 of said radial extension apparatus 10. Each of said clamps 30 are welded or fixably attached to the bottom 12 of said radial extension apparatus 10 such that the second end 32 of each of said clamps 30 face towards the center 16 of said radial extension apparatus 10 and such that said recess 35 faces towards the center 16 of said radial extension apparatus 10.

The first of the three clamps 30-1 is welded or fixably attached to the bottom 12 of said radial extension apparatus 10 at a position of approximately zero degrees 40. The second of the three clamps 30-2 is welded or fixably attached to the bottom 12 of said radial extension apparatus 10 at a position of approximately ninety degrees 41. The third of the three clamps 30-3 is welded or fixably attached to the bottom 12 of said radial extension apparatus 10 at a position of approximately one hundred and eighty degrees 42.

Figure 18:
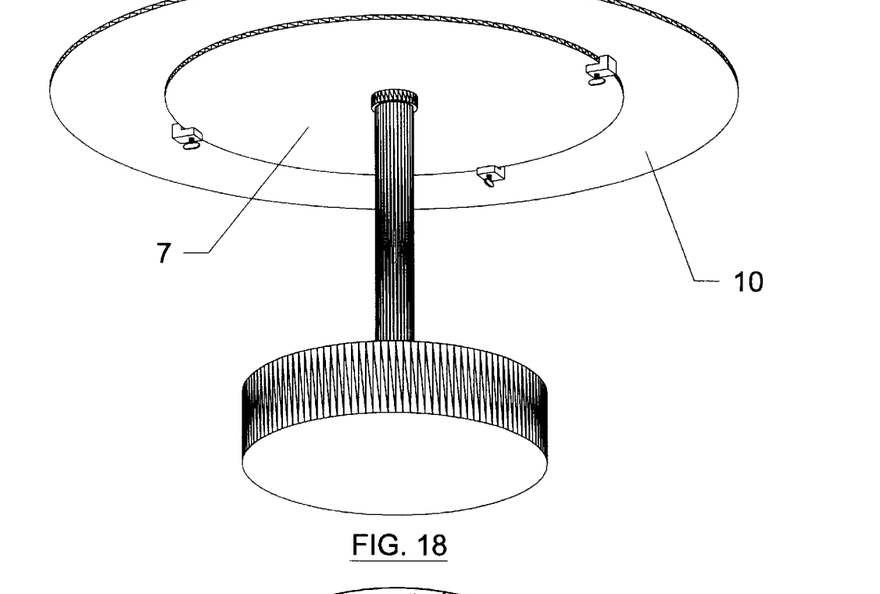
FIG. 18 is a perspective view of the radial extension apparatus as attached to an existing rotational cake decorating apparatus.

As shown in FIG. 18, the bottom 12 of said radial extension apparatus 10 is removably attached to the top 7-1 of said cake-support-surface 7 of said existing rotational cake decorating apparatus 4 by sliding said cake-support-surface 7 into said recess 35 defined by each of said clamps 30 and said bottom 12 of said radial extension apparatus 10. Said radial extension apparatus 10 is secured in place by tightening said thumb-screws 46 until said shaft 47 applies a compressive force to the bottom 7-2 of said cake-support-surface 7 of said existing rotational cake decorating apparatus 4, thus removably attaching said cake-support-surface 7 of said existing rotational cake decorating apparatus 4 to said radial extension apparatus 10.

Other methods of providing said means for removably attaching 29 said radial extension apparatus 10 to an existing rotational cake decorating apparatus are well known to one skilled in the art.

A plurality of novel gripping means 14 are disposed on the bottom surface 12 of said radial extension apparatus 10 and are shown in FIG. 19, FIG. 20, FIG. 21, FIG. 22 and FIG. 23. Said plurality of gripping means 14 are disposed on a portion 21 of the bottom surface 12 of said radial extension apparatus 10. Said portion 21 is defined on the bottom surface 12 of said radial extension apparatus 10, extending from the edge 17 of said radial extension apparatus 10 radially inward approximately two inches.

Figure 19:
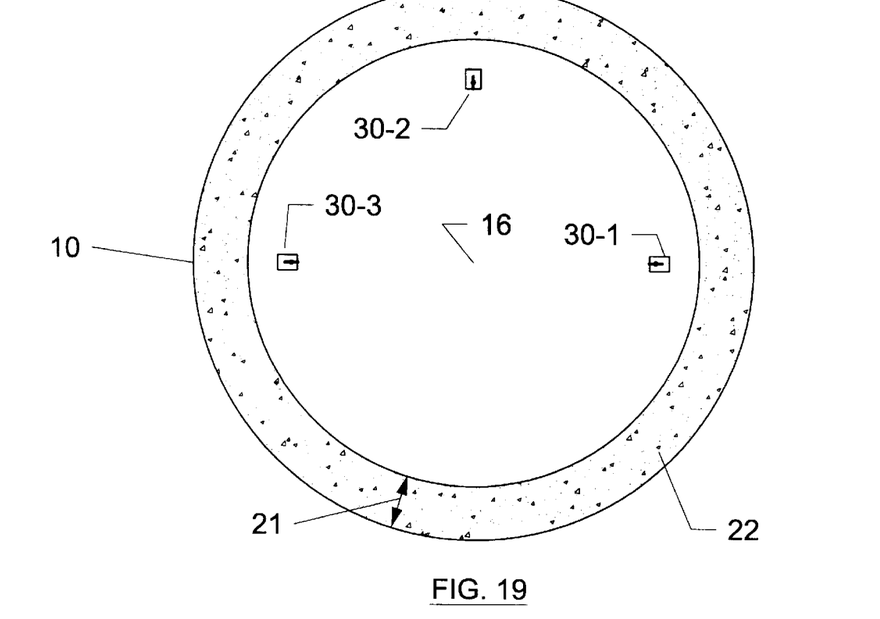
FIG. 19 is a bottom view the radial extension apparatus detailing the gripping texture embodiment of the plurality of gripping means.

In one embodiment contemplated by the inventor shown in FIG. 19, said plurality of gripping means 14 is a gripping texture 22 radially disposed within said portion 21 on said bottom surface 12 of said radial extension apparatus 10. In one alternative of this embodiment, said gripping texture 22 is provided by knurling and the like within said portion 21 on said bottom surface 12 of said radial extension apparatus 10. Using this embodiment, the adjustment of the radial position of said radial extension apparatus 10 while removably attached to an existing rotational cake decorating apparatus 4 is achieved when the decorator "walks" their fingers from said gripping texture 22 near the edge 17 of said radial extension apparatus 10 to said gripping texture 22 near the center 16 of said radial extension apparatus 10.

Figure 20:
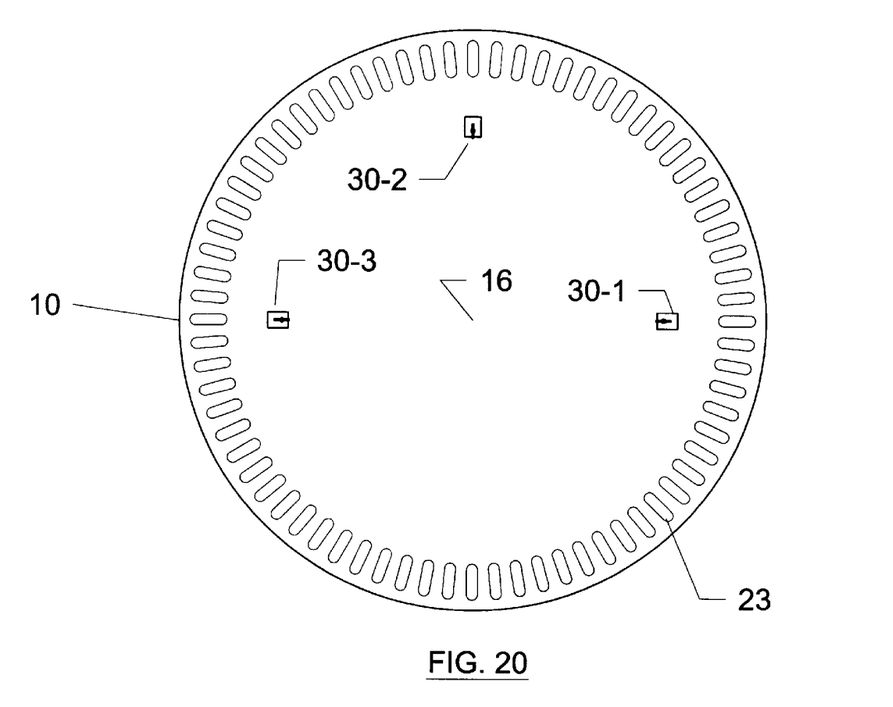
FIG. 20 is a bottom view the radial extension apparatus detailing the linear protrusion embodiment of the plurality of gripping means.
Figure 21:
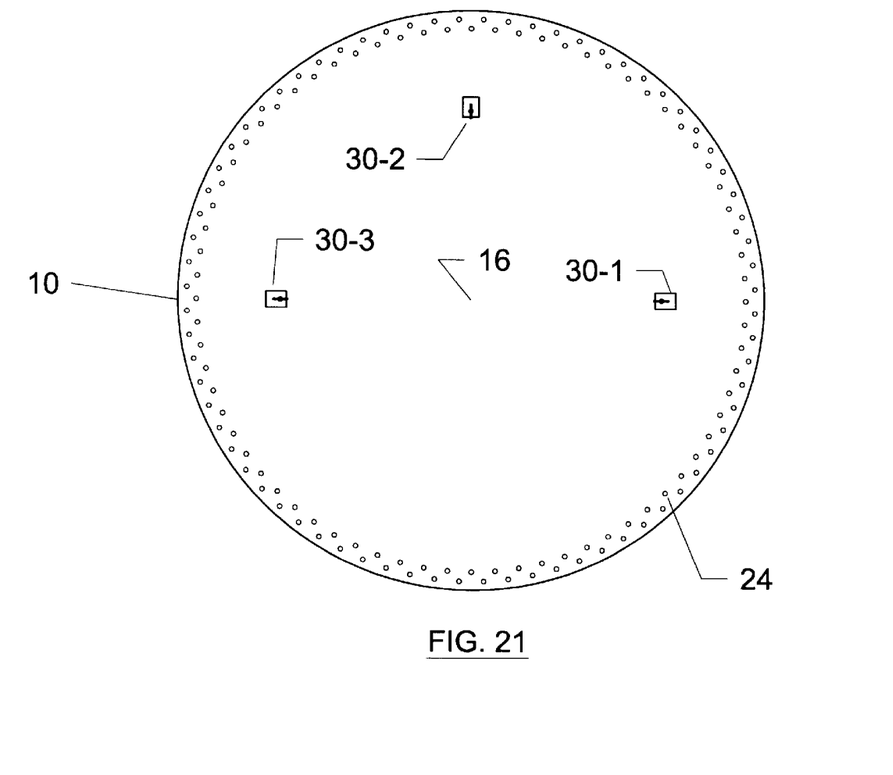
FIG. 21 is a bottom view the radial extension apparatus detailing the circular protrusion embodiment of the plurality of gripping means.

In another embodiment contemplated by the inventor, said plurality of gripping means 14 is a plurality of protrusions radially disposed in one or more rows within said portion 21 on said bottom surface 12 of said radial extension apparatus 10. In one alternative of this embodiment as shown in FIG. 20, said protrusions are linear protrusions 23 provided in one row. In a second alternative of this embodiment as shown in FIG. 21, said protrusions are circular protrusions 24 provided in two rows. Using these embodiments, the adjustment of the radial position of said radial extension apparatus 10 while removably attached to an existing rotational cake decorating apparatus 4 is achieved when the decorator "walks" their fingers from one of said plurality of protrusions near the edge 17 of said radial extension apparatus 10 to another of said plurality of protrusions near the center 16 of said radial extension apparatus 10.

In yet another embodiment contemplated by the inventor, said plurality of gripping means 14 is a plurality of indentations radially disposed in one or more rows within said portion 21 on said bottom surface 12 of said radial extension apparatus 10.

Figure 22:
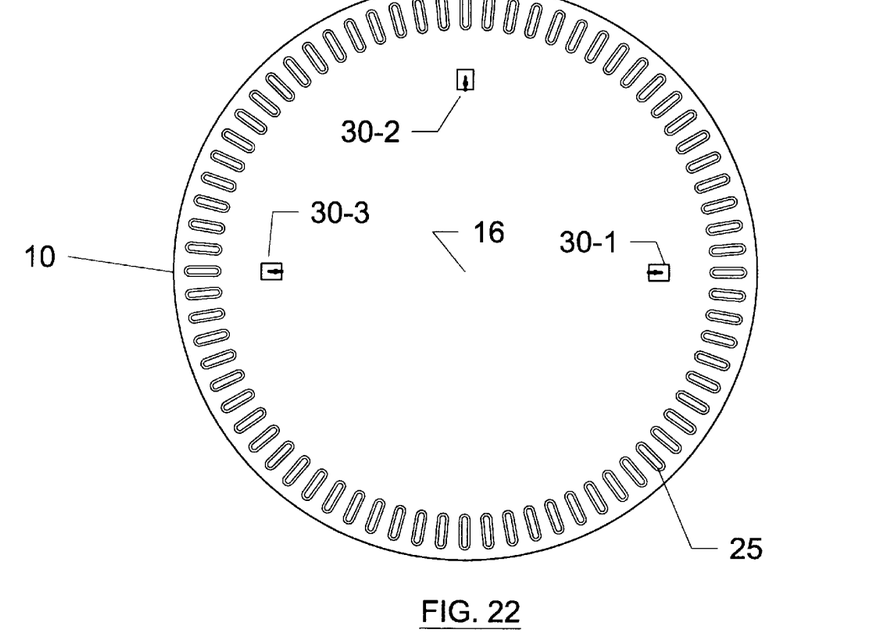
FIG. 22 is a bottom view the radial extension apparatus detailing the linear indentation embodiment of the plurality of gripping means.
Figure 23:
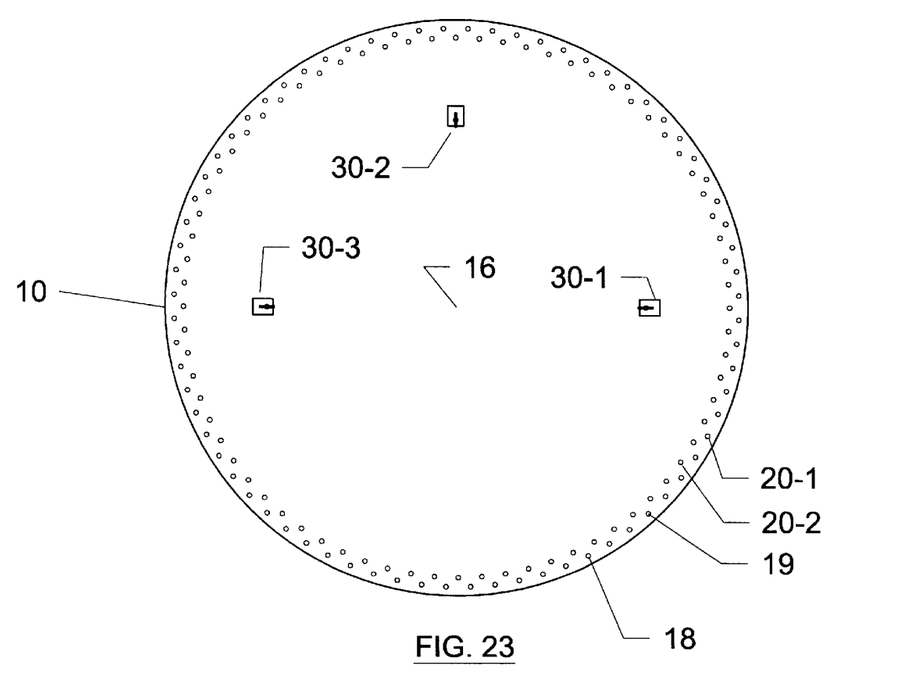
FIG. 23 is a bottom view the radial extension apparatus detailing the divot hole embodiment of the plurality of gripping means.

In one alternative of this embodiment as shown in FIG. 22, said indentations are linear indentations 25 provided in one row. In a second alternative of this embodiment as shown in FIG. 23, said indentations are circular divot holes 18 provided in two rows. This configuration is the preferred embodiment and is described in detail below. Using these embodiments, the adjustment of the radial position of said radial extension apparatus 10 while removably attached to an existing rotational cake decorating apparatus 4 is achieved when the decorator "walks" their fingers from one of said plurality of indentations near the edge 17 of said radial extension apparatus 10 to another of said plurality of indentations near the center 16 of said radial extension apparatus 10.

In the preferred embodiment, shown in FIG. 23, said plurality of gripping means 14 are circular divot holes 18 approximately 0.08 inches deep and approximately 0.5 inches in diameter. Said divot holes have a center 19. Said divot holes 18 are provided in two rows 20-1 and 20-2 around the circumference of said radial extension apparatus 10. The first row 20-1 of divot holes 18 is closest to the edge 17 of said radial extension apparatus 10. The second row 20-2 of divot holes 18 is farthest from the edge 17 of said radial extension apparatus 10.

The centers 19 of said divot holes 18 in said first row 20-1 are approximately 0.5 inches from the edge 17 of said radial extension apparatus 10. The centers 19 of said divot holes 18 in said first row 20-1 are approximately 0.75 inches apart from one another. There are a total of seventy-two divot holes 18 in said first row 20-1.

The centers 19 of said divot holes 18 in said second row 20-2 are approximately 1.125 inches from the edge 17 of said radial extension apparatus 10. The centers 19 of said divot holes 18 in said second row 20-2 are approximately 0.6875 inches apart from one another. There are a total of seventy-two divot holes 18 in said second row 20-2. The centers 19 of said divot holes 18 in said second row 20-2 are offset to either side of the centers 19 of said divot holes 18 in said first row 20-1.

Using said divot holes 18 in the configuration described above allows the user to rotate the radial position of said radial extension apparatus 10 while removably attached to an existing rotational cake decorating apparatus 4 by "walking" their fingers from one divot hole 18 in the first row 20-1 to another divot hole 18 in the second row 20-2. The divot holes 18 provide a means for gripping that can easily be cleaned by providing large rounded corners.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the following claims.

What is claimed is:

1. A donut shaped apparatus to be affixably attached to an existing rotational cake decorating apparatus having a base with a top, a bottom and a center, a shaft with a top end and a bottom end; a rotatably adjustable cake-support-surface with a top, a bottom, a diameter and a center; the bottom end of said shaft is fixably attached to the center of the top of said base; the top end of said shaft is rotatably attached to the center of the bottom of said cake-support-surface, said donut shaped apparatus comprising:

a thickness defined by a circular bottom surface and a circular top surface, an outer diameter, and an inner diameter, said outer diameter is approximately one half of an inch less than the diameter of said cake-support-surface and said inner diameter is approximately two inches less than said outer diameter;

a means for affixably attaching said circular top surface of said donut shaped apparatus to the bottom of said cake-support-surface; and a plurality of gripping means disposed in said circular bottom surface of said donut shaped apparatus.

2. A donut shaped apparatus as claimed in claim 1, wherein said outer diameter of said donut shaped apparatus is approximately eleven and one half inches.

3. A donut shaped apparatus as claimed in claim 1, wherein said plurality of gripping means is a gripping texture.

4. A donut shaped apparatus as claimed in claim 3, wherein knurling provides said gripping texture.

5. A donut shaped apparatus as claimed in claim 1, wherein said plurality of gripping means is a plurality of protrusions radially disposed in one or more rows.

6. A donut shaped apparatus as claimed in claim 5, wherein said plurality of protrusions are linear protrusions radially disposed in a row, said row of linear protrusions extend from said outer diameter of said donut shaped apparatus to said inner diameter of said donut shaped apparatus.

7. A donut shaped apparatus as claimed in claim 5, wherein said plurality of protrusions are circular protrusions radially disposed in a first row and a second row, said first row is located towards said outer diameter of said donut shaped apparatus and said second row is located towards said inner diameter of said donut shaped apparatus.

8. A donut shaped apparatus as claimed in claim 1, wherein said plurality of gripping means is a plurality of indentations radially disposed in one or more rows.

9. A donut shaped apparatus as claimed in claim 8, wherein said plurality of indentations are linear indentations radially disposed in a row, said row of linear indentations extend from said outer diameter of said donut shaped apparatus to said inner diameter of said donut shaped apparatus.

10. A donut shaped apparatus as claimed in claim 8, wherein said plurality of indentations are circular divot holes radially disposed in a first row and a second row, said first row is located towards said outer diameter of said donut shaped apparatus and said second row is located towards said inner diameter of said donut shaped apparatus.

11. An attachment for a lazy susan, comprising:

a bottom surface, a top surface, an outer diameter, and an inner diameter, said lazy susan having a rotatably adjustable cake-support-surface with a lower surface, said outer diameter of said attachment being smaller than an outer diameter of said rotatably adjustable means for attaching said top surface of said attachment to said lower surface of said rotatably adjustable cake-support-surface within said outer diameter of said rotatably adjustable cake-support-surface; and means for gripping defined in said bottom surface of said attachment.

12. The attachment of claim 11, where said means for attaching comprises an adhesive disposed on said top surface of said attachment.

13. The attachment of claim 11, wherein said outer diameter of said attachment is less than twelve inches.

14. The attachment of claims 11, wherein said means for gripping is selected from the group consisting of gripping texture, gripping protrusions, and gripping indentations.

15. The attachment of claim 11, wherein said gripping means comprises gripping divots disposed in one or more radial rows.

16. The attachment of claim 11, wherein said attachment is a food grade material selected from the group consisting of aluminum, plastic, rubber, and stainless steel.

17. A method of improving a rotatably adjustable cake-support-surface, comprising:

providing a food grade attachment including an adhesive top surface and a bottom surface having gripping indentations defined therein, said attachment having an outer dimension smaller than an outer dimension of the rotatably adjustable cake-support-surface;

securing said adhesive top surface to a lower surface of said cake-support-surface such said outer dimension of said attachment is within the outer dimension of the rotatably adjustable cake-support-surface and such that said gripping indentations are presented to a user to facilitate rotation of said cake-support-surface.

18. The method of claim 17, further comprising disposing said gripping indentations in one or more radial rows such that rotation of said cake-support-surface is facilitated by said user walking their fingers between said gripping indentations.

* * * * *